(12) United States Patent
Jackson et al.

(10) Patent No.: US 9,308,483 B2
(45) Date of Patent: Apr. 12, 2016

(54) FILTER ASSEMBLY

(75) Inventors: Paul Jackson, Newcastle Upon (GB); Jamie Donaldson, Bedlington (GB)

(73) Assignee: AAF LTD., Cramlington, Northumberland (GB)

( * ) Notice: Subject to any disclaimer, the term of this patent is extended or adjusted under 35 U.S.C. 154(b) by 205 days.

(21) Appl. No.: 14/123,457

(22) PCT Filed: Jun. 1, 2012

(86) PCT No.: PCT/EP2012/060435
§ 371 (c)(1),
(2), (4) Date: May 7, 2014

(87) PCT Pub. No.: WO2012/164087
PCT Pub. Date: Dec. 6, 2012

(65) Prior Publication Data
US 2014/0250845 A1    Sep. 11, 2014

(30) Foreign Application Priority Data

Jun. 3, 2011 (GB) .................................. 1109388.7

(51) Int. Cl.
*B01D 46/12* (2006.01)
*B01D 46/00* (2006.01)
*B01D 46/02* (2006.01)

(52) U.S. Cl.
CPC ............ *B01D 46/12* (2013.01); *B01D 46/0005* (2013.01); *B01D 46/0023* (2013.01); *B01D 46/02* (2013.01); *B01D 46/125* (2013.01); *B01D 2265/028* (2013.01)

(58) Field of Classification Search
CPC ........... B01D 46/0005; B01D 46/0023; B01D 46/0024; B01D 46/12; B01D 46/125; B01D 46/002; B01D 2265/028
See application file for complete search history.

(56) References Cited

U.S. PATENT DOCUMENTS

| | | |
|---|---|---|
| 2,077,951 A | 4/1937 | Myers |
| 5,102,436 A | 4/1992 | Grabowski |
| 5,601,711 A | 2/1997 | Sklar et al. |
| 5,853,445 A | 12/1998 | Wong et al. |
| 5,976,225 A | 11/1999 | Nystrom et al. |
| 6,247,997 B1 | 6/2001 | Khalaj |
| 6,348,077 B1 | 2/2002 | Solberg, Jr. et al. |
| 6,361,577 B1 | 3/2002 | Unrath et al. |
| 6,467,481 B1 | 10/2002 | Eswarappa |

(Continued)

FOREIGN PATENT DOCUMENTS

| | | |
|---|---|---|
| EP | 0082106 A2 | 6/1983 |
| WO | WO-01-97946 A1 | 12/2001 |
| WO | WO2012038317 A1 | 3/2012 |

OTHER PUBLICATIONS

Examination Report for EPC Application No. 12725738.4 mailed Apr. 4, 2015, 4 pages.

(Continued)

*Primary Examiner* — Robert Clemente
(74) *Attorney, Agent, or Firm* — Haynes and Boone, LLP

(57) ABSTRACT

A filter assembly is provided which is particularly suitable for use in filtering intake air for gas turbines. The filter assembly (6) includes a final filter (9) and a pre-filter (8) which are directly engageable one with the other to provide a complete filter assembly. By so providing, pre-filter units may easily be removed and replaced in a compact configuration. A kit of parts is also provided.

14 Claims, 10 Drawing Sheets

(56) References Cited

U.S. PATENT DOCUMENTS

| | | |
|---|---|---|
| 2006/0207233 A1 | 9/2006 | Hord et al. |
| 2006/0272302 A1 | 12/2006 | Stock et al. |
| 2008/0302073 A1 | 12/2008 | Wang et al. |
| 2012/0011817 A1* | 1/2012 | Borkent ............. B01D 46/0023 55/419 |

OTHER PUBLICATIONS

Search Report for GB1109388.7 mailed Oct. 3, 2011, 4 pages.
International Search Report for PCT/EP2012/060435 mailed Aug. 21, 2012, 4 pages.

* cited by examiner

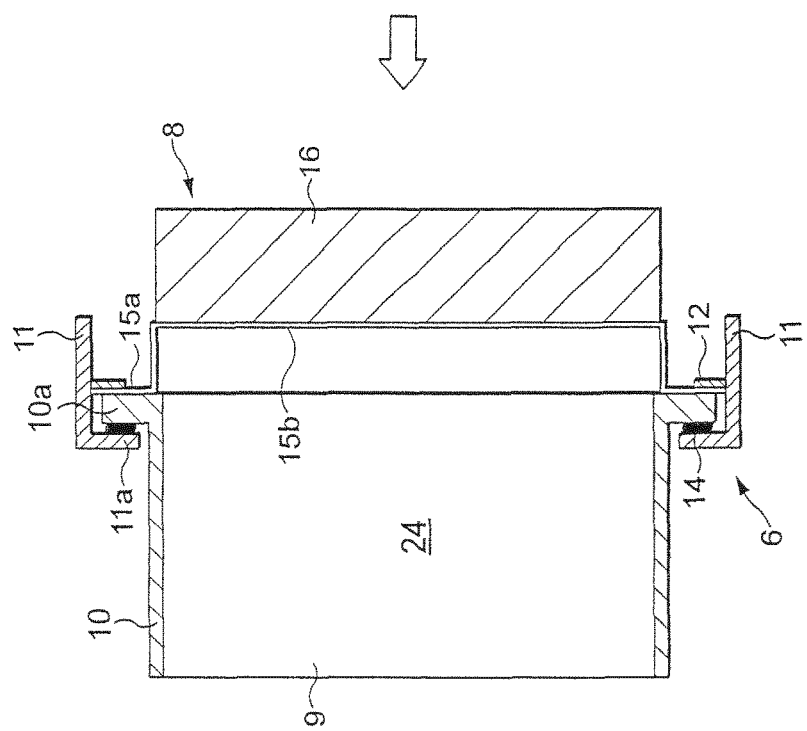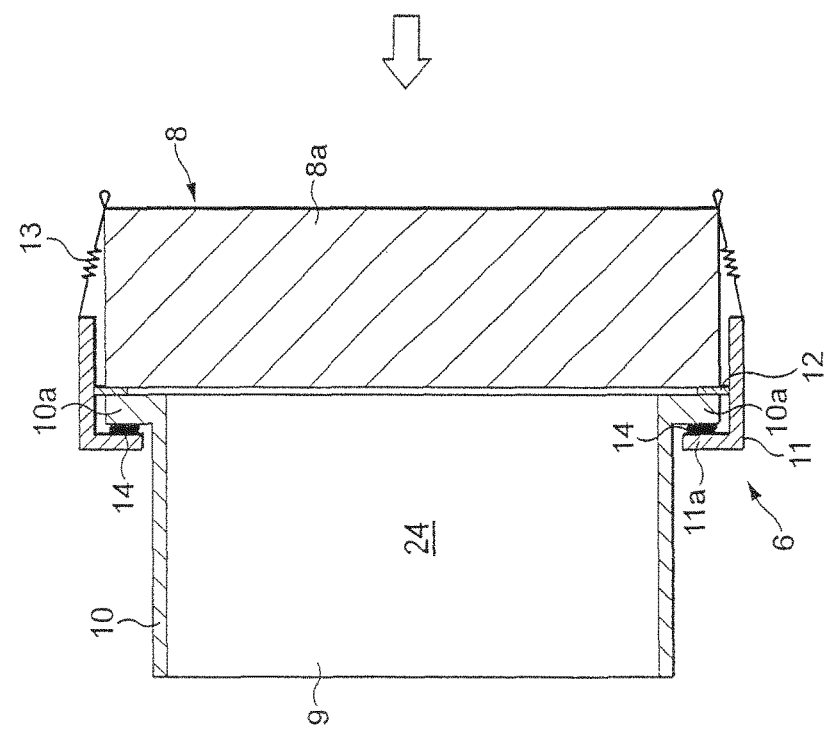

FILTER ASSEMBLY

CROSS-REFERENCE TO RELATED APPLICATIONS

This application is a United States national phase of co-pending international patent application No. PCT/EP2012/060435, filed Jun. 1, 2012, which claims priority to Great Britain application No. GB1109388.7, filed Jun. 3, 2011, the disclosures of which are incorporated herein by reference.

FIELD OF THE INVENTION

The present invention relates to a filter assembly in particular, but not exclusively, for use in filtering intake air for gas turbines.

BACKGROUND TO THE INVENTION

Gas turbines, in particular gas turbines used for power generation, are very sensitive to the quality of inlet air drawn into the combustion chamber of the gas turbine. Particularly, contaminant particulate matter can damage turbine blades and can induce corrosion in the working parts of the turbine. As a consequence, mechanical reliability can decrease, along with operating efficiency.

It is customary in the art of gas turbine manufacture to provide a filter section upstream of the air intake to the combustion chamber of the gas turbine to filter the air drawn in to the required quality. The nature of the filtration will depend on the expected environment in which the turbine is to be operated and particularly on the expected contaminant levels in the air. To cope with a wide variety of contaminant particle sizes while avoiding filters from becoming too-rapidly obstructed, it is known to provide several filtration stages sequentially in the path of the incoming air. Such typically will include coarser pre-filter stages to exclude large-dimension contaminant particles followed by a final filtration stage designed to exclude the very smallest particles, in order to achieve the required design specification for the inlet air to the combustion chamber.

FIG. 1 shows a typical schematic configuration of a conventional gas turbine arrangement, showing major parts only. The gas turbine 1 includes a combustion chamber 3 located between two sets of rotor blades 2. The two sets of rotor blades are connected by a shaft, which causes the two sets of rotor blades to rotate synchronously. Upstream of the combustion chamber are compressor blades which compress the air in the combustion chamber, while downstream of the combustion chamber are turbine blades which extract motive energy from the hot gas leaving the combustion chamber. Into the combustion chamber is injected fuel from a fuel supply 4, the combustion of which fuel elevates the temperature in the combustion chamber to produce the flow of hot gas which drives the turbine blades. Since more power is produced by the combustion of the fuel then is necessary to compress the air in the combustion chamber, useful power may be extracted from the rotation of the shaft while waste heat from the exhaust gases can be further used to produce additional power.

Air is drawn into the combustion chamber by the compressor blades through air transition duct 7, which communicates with the local atmosphere through inlet duct 5, in which is positioned filter assembly 6. Therefore, the air entering the combustion chamber is, by means of suitable configuration of filter assembly 6, maintained within the optimal working specification for the working parts of the turbine.

FIGS. 2 and 3 show examples of configurations of filter assemblies previously known to the Applicant, in diagrammatic longitudinal section.

FIG. 2 shows a two-stage filter arrangement wherein a final filter 9 is combined with a pre-filter 8 to achieve a two-stage filtration of incoming air, which passes through the filter in the direction shown by the arrow. The final filter 9 includes a casing 10 which houses one or more filter elements 24, which are made of a filter medium having a large number of small pores formed therein to trap particulate matter.

The final filter 9 is mounted to the inlet duct by means of mounting frame 11, which itself is placed in the inlet duct so as to occlude the entrance thereto. The mounting frame 11 provides an end seal 11a against which peripheral flange 10a of the casing of the final filter rests, with a sealing gasket 14 interposed therebetween, to seal the casing to the mounting frame. Peripheral flange 10a is urged against gasket 14 by retaining element 12 to securely hold the casing in position in the frame.

A pre-filter 8 is then positioned upstream of the final filter to occlude the aperture in the mounting frame with at least one further pre-filter element 8a, made of a different filter medium, usually having a pore size suitable for trapping particular matter having a larger diameter than that trapped by filter element 24. Pre-filter 8 is mounted directly to mounting frame 11 by means of retaining springs 13, which engage with fixtures on the pre-filter and urge the pre-filter 8 against the mounting frame 11. Therefore, gas drawn in through the inlet duct 5 must pass through both pre-filter 8 and final filter 9 in sequence before reaching the combustion chamber.

FIG. 3 shows an alternative configuration to the arrangement of FIG. 2 in which like parts are shown with identical reference numbers to those in FIG. 2.

The arrangement of FIG. 3 differs in that rather than the pre-filter 8 being urged against mounting frame 11 by retaining springs 13, an adaptor plate is provided having a peripheral flange 15a sandwiched between retaining element 12 and peripheral flange 10a of casing 10, to principal portion 15b of which one or more filter cartridges are engaged by engaging means not shown in the Figure. This latter arrangement is described in detail in co-pending British National patent application number 1016164.4, in the name of the present Applicant.

Shown in FIG. 4 is a third alternative configuration to the arrangement of FIGS. 2 and 3, in which like parts are again shown with identical reference numbers. This configuration is different from that of FIGS. 2 and 3 in that a remote pre-filter holding frame 16 is provided, to which pre-filter 8 is urged by a pre-filter retaining means, not shown. The distance A between the pre-filter holding frame 16 and the filter holding frame 11 is sufficient to permit the filter 9 to be displaced in the upstream flow direction and then removed, e.g. from a side door in the duct in which frames 11 and 16 are located, so as to permit the filter 9 to be changed without removing pre-filter 8.

However, in each of these arrangements, there is a problem that separate mounting arrangements must be made for both the pre-filter and to the main-filter. This leads to complexity in either manufacture or in maintenance, for example when a pre-filter or a main-filter must be changed, generally either both filters will need to be disengaged from a common frame, such as in the examples of FIGS. 2 and 3, or additional space needs to be provided between the pre-filter and the final filter to enable independent maintenance of each, such as in the example of FIG. 4.

There is therefore a need for a pre-filter/main-filter assembly which is easy to maintain while being able to relatively retain the pre-filter and final filter in an operative configuration.

SUMMARY OF THE INVENTION

According to a first aspect of the present invention there is provided a filter assembly comprising a filter casing having an inlet aperture and being adapted to permit gas to flow through the casing; a filter medium provided to the casing to filter gas flowing through the casing; and a pre-filter, the pre-filter comprising a pre-filter casing having an outlet aperture and adapted to permit gas to flow through the pre-filter casing; and a pre-filter medium provided to the pre-filter casing to filter gas flowing through the pre-filter casing, wherein the pre-filter casing is releasably engaged directly with the filter casing so as to fixedly position the outlet aperture of the pre-filter casing over the inlet aperture of the filter casing, thereby to seal the inlet and outlet apertures together. Such a filter assembly allows a pre-filter to be securely Positioned in relative orientation to the final filter while permitting easy removal and replacement of the pre-filters during a maintenance operation.

In a particular embodiment of the invention, there is Provided a filter assembly wherein the pre-filter casing is adapted to engage directly with the filter casing by means of one of: a) a fixing tang provided to the pre-filter casing and a corresponding fixing lip provided to the filter casing; and b) a fixing tang provided to the filter casing and a corresponding fixing lip provided to the pre-filter casing, such that by aligning the fixing tang with the fixing lip and relatively approximately the filter casing and the pre-filter casing, a snap-fit engagement may be achieved. Such an arrangement is able to provide a particularly, secure engagement whilst being easy to manufacture and maintain.

According to a particular embodiment of the present invention, there is provided a filter assembly wherein one of: a) a locating projection is provided to the pre-filter casing and a corresponding locating surface is provided to the filter casing; and b) a locating projection is provided to the filter casing and a corresponding locating surface is provided to the pre-filter casing, such that by positioning the locating projection against the locating surface, the inlet and outlet apertures become aligned. Such an embodiment is able to provide an arrangement which is particularly easy to remove and replace, without the requirement of specialised skill on the part of the maintainer.

According to a particular embodiment of the present invention, there is provided a filter assembly wherein the filter casing comprises: top and bottom cell plates for defining a filter cell with the filter medium; first and second side support elements for maintaining the cell plates at a predetermined spacing; and optionally, a plurality of inner support elements for spacing individual elements of the filter medium one from another. Such an arrangement provides a robust and easy to manufacture filter arrangement which has good structural rigidity.

According to a further aspect of the present invention, there is provided a filter assembly wherein the pre-filter casing comprises: top and bottom cell plates for defining a pre-filter cell with the filter medium; and an outlet plate and an outer support element for maintaining the cell plates at a predetermined spacing. Such a embodiment provides a pre-filter arrangement which is easy to manufacture and has good structural rigidity.

According to a particular embodiment of the present invention, there is provided a filter assembly wherein the filter casing defines a plurality of V-shaped filter cells arranged in a row running perpendicular to the direction of gas flow through the casing. Such an arrangement is particularly suitable for filtering high flow rates of gas even in heavily contaminated atmospheres.

According to a particular embodiment of the present invention, there is provided a filter assembly wherein the filter medium is located, relative to the top and bottom cell plates by retaining structures formed on the cell plates. Such an embodiment is particularly easy to assemble, even without particular skill.

According to a particular embodiment of the present invention, there is provided a filter assembly wherein the pre-filter casing defines a V-shaped filter cell. Such an arrangement is particularly able to provide pre-filtering of large volumes of air, even in contaminated atmospheres.

According to a particular embodiment of the present invention, there is provided a filter assembly wherein the filter casing has a plurality of inlet apertures, each inlet aperture being associated with a filter cell, and wherein the filter casing is adapted to be engaged directly with a corresponding plurality of discrete pre-filter casings, each pre-filter casing being adapted to engage with the filter casing to seal each outlet aperture over a respective one of the inlet apertures. Such an arrangement allows easy replacement of contaminated sections of filter media, reducing the cost of individual maintenance operations.

According to a particular embodiment of the present invention, there is provided a filter assembly wherein the filter is adapted for use as an air intake filter, preferably an air intake filter for a gas turbine. Such an arrangement is particularly suitable for use in the power generation industry.

According to a second aspect of the present invention, there is provided a filter comprising a filter casing having an inlet aperture and being adapted to permit gas to flow through the casing; and a filter medium provided to the casing to filter gas flowing through the casing, wherein the filter casing is provided with first engaging means adapted to be engaged directly with a pre-filter casing having second complementary engaging means provided thereto so as to fixedly position an outlet aperture of the pre-filter casing over the inlet aperture of the filter casing, thereby to seal the inlet and outlet apertures together. Such a filter allows a pre-filter to be positioned in relative orientation to the main-filter while permitting easy removal and replacement of the filters during a maintenance operation.

In a particular embodiment of the invention, there is Provided a filter wherein the filter casing is adapted to be engaged directly with the pre-filter casing by means of one of: a) a fixing lip provided to the filter casing for engaging a corresponding fixing tang provided to the pre-filter casing; and b) a fixing tang provided to the filter casing for engaging a corresponding fixing lip provided to the pre-filter casing, such that by aligning the fixing tang with the fixing lip and relatively approximating the filter casing and the pre-filter casing, a snap-fit engagement may be achieved. The arrangement is able to provide a particularly secure engagement whilst being easy to manufacture and maintain.

According to a particular embodiment of the present invention, there is provided a filter wherein one of a) a locating projection is provided to the filter casing so correspond to a locating surface provided to the filter casing; and b) a locating surface is provided to the filter casing to correspond to a locating projection provided to the pre-filter casing, such that by positioning the locating projection against the locating surface, the inlet and outlet apertures become aligned. Such an embodiment is able to provide an arrangement which is particularly easy to remove and replace, without the requirement of specialised skill.

According to a particular embodiment of the present invention, there is provided a filter wherein the filter casing comprises top and bottom cell plates for defining a filter cell with the filter medium; first and second side support elements for maintaining the cell plates at a predetermined spacing; and optionally, a plurality of inner support elements for spacing individual elements of the filter medium one from another. Such an arrangement provides a robust and easy to manufacture filter arrangement which has good structural rigidity.

According to a particular embodiment of the present invention, there is provided a filter wherein the filter casing defines a plurality of V-shaped filter cells arranged in a row running perpendicular to the direction of gas flow through the casing. Such an arrangement can provide a pre-filter arrangement which is easy to manufacture and has good structural rigidity.

According to a particular embodiment of the present invention, there is provided a filter assembly wherein the filter medium is located relative to the top and bottom cell plates by retaining structures formed on the cell plates. Such an arrangement is particularly suitable for filtering high flow rates of gas even in heavily contaminated atmospheres.

According to a particular embodiment of the present invention, there is provided a filter assembly wherein the filter casing has a plurality of inlet apertures, each inlet aperture being associated with a filter cell, and wherein the filter casing is adapted to be engaged directly with a corresponding plurality of discrete pre-filter casings, each pre-filter casing being adapted to engage with the filter casing to seal each outlet aperture over a respective one of the inlet apertures. Such an embodiment is particularly easy to manufacture, even without particular skill.

According to a third aspect of the present invention, there is provided a pre-filter comprising a pre-filter casing having an outlet aperture and adapted to permit gas to flow through the casing; and a pre-filter medium provided to the pre-filter casing to filter gas flowing through the pre-filter casing, wherein the pre-filter casing is provided with first engaging means adapted to engage directly with a filter casing having second complementary engaging means provided thereto so as to fixedly position the outlet aperture of the pre-filter casing over an inlet aperture of the filter casing, thereby to seal the inlet and outlet apertures together. Such an arrangement is easily and conveniently replaced during maintenance operations.

According to a particular embodiment of the present invention there is provided a pre-filter wherein the pre-filter casing comprises top and bottom cell plates for defining a pre-filter cell with the filter medium; and an outlet aperture plate and an outer support element for maintaining the cell plates at a predetermined spacing. Such an arrangement is high in structural rigidity and easy to manufacture.

According to a particular embodiment of the present invention there is provided a pre-filter wherein the pre-filter casing defines a V-shaped filter cell. Such an arrangement is able to filter large volumes of air efficiently.

According to a fourth aspect of the present invention, there is provided a kit of parts comprising a filter according to the second aspect of the invention and a pre-filter according to the third aspect of the invention. Such permits easy assembly and maintenance of a filter assembly.

BRIEF DESCRIPTION OF THE DRAWINGS

To enable a better understanding of the present invention, and to show how the same may be carried in to effect, reference will now be made by way of example only, to the accompanying drawings:

FIG. 2 is a longitudinal section through a filter assembly for use with the arrangement of FIG. 1;

FIG. 3 is an alternative configuration of a filter assembly also suitable for use in the arrangement of FIG. 1;

FIG. 7b is a cross-section the fixing tang shown in FIG. 7a;

FIG. 8b is a plan view of the arrangement of FIG. 8a;

DETAILED DESCRIPTION

Figure 1:
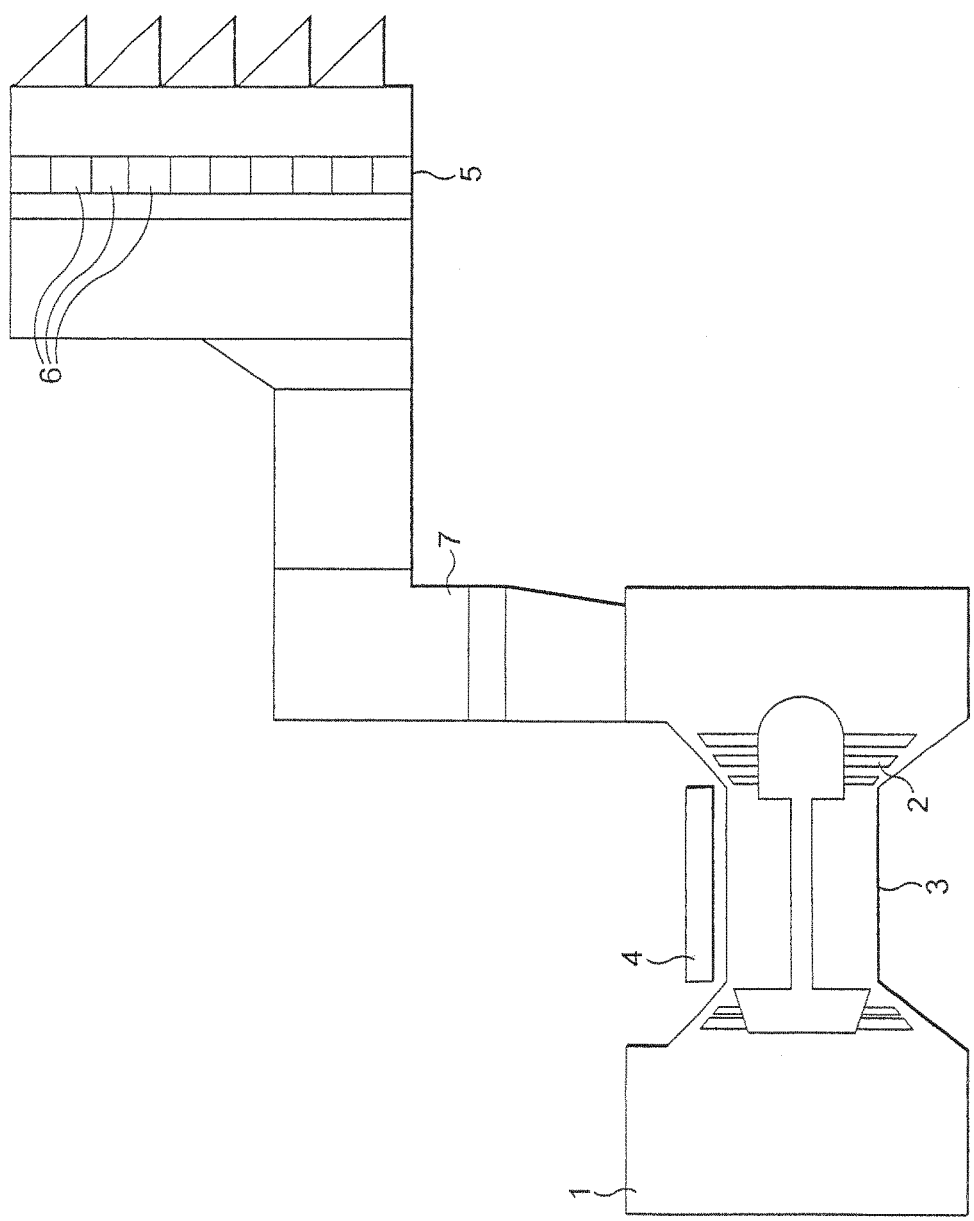
FIG. 1 is a schematic diagram of a gas turbine arrangement.
Figure 4:
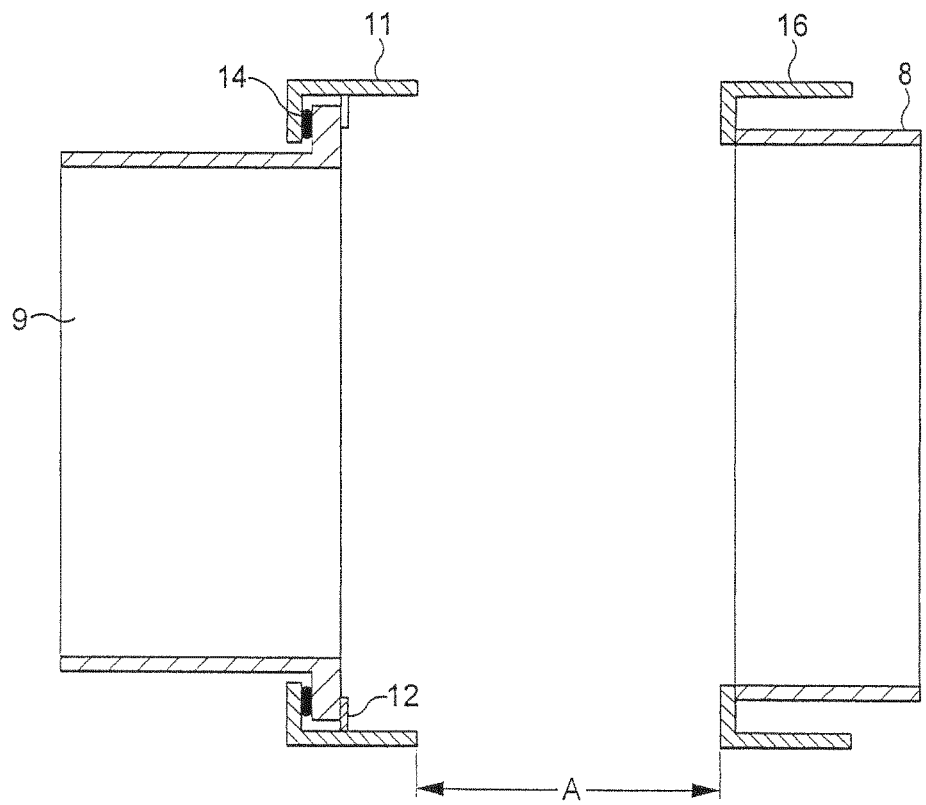
FIG. 4 is a further alternative configuration of a filter assembly also suitable for use in the arrangement of FIG. 1.

An exemplary final filter assembly, being an embodiment of the present invention, is shown in FIG. 4.

The final filter assembly shown in FIG. 4 includes a bottom cell plate 17b and a top cell plate 17a, between which are positioned, in a vertical orientation, filter elements 24, being portions of a filter medium such as a woven glass fiber mat. The top cell plate 17a and the bottom cell plate 17b together define V-shaped filter cells, the opposed V-shaped walls of the filter cells each being formed from a portion of the filter medium mutually inclined to cause the filter cell to taper in a downstream direction toward the tip of the V.

To ensure that the top cell plate 17a and the bottom cell plate 17b are separated by a consistent distance to match the height of the filter elements 24, rod-like side support elements 18a and 18b are provided, which engage with appropriately-formed recesses in the top and bottom cell plates 17a and 17b to fixedly space the cell plates one from the other. Each of the cell plates 17a and 17b includes a bar portion at an air inlet side thereof, which, together with the side support elements 18a and 18b defines a generally rectangular frame surrounding the inlet apertures of the V-shaped filter cells. The top and bottom cell plates, together with the side support elements, and the inner and outer support elements together form the final filter casing 10, in which the filter elements 24 are held.

In conventional applications, the external dimensions of this rectangular frame is preferably within the range of 50 to 70 cm, but will naturally depend on the dimensions of the inlet duct to which the filter assembly is to be mounted. Specifically, the outer dimensions of this frame should be substantially similar to those of the inlet duct so as to maximise the operating cross-section of the inlet duct, while the inner dimensions will be selected to achieve a suitably large operating cross-section of the inlet apertures without compromising the structural rigidity of the casing. All dimensions are thus variable to suit particular requirements.

In the embodiments shown in FIG. 4, inner support elements 19 and outer support elements 20 are provided to cover the upstream and downstream ends of the filter elements 24, both to add structural rigidity to the filter assembly and to seal any gaps both between the V-shaped filter cells and at the downstream vertices of the filter cells, respectively.

Of course, in one alternative embodiment, a single sheet of filter medium may be repeatedly folded to provide a plurality of V-shaped cells; in such a case, inner support elements 19 and outer support elements 20 might be omitted. However, they are presently preferred both due to the ease of manufacture of working with individual sheets of filter element and due to the improved structural rigidity to which the additional support elements confer on the filter assembly as a whole.

The embodiment shown in FIG. 4 exhibits four inlet apertures defined between the side support elements and the inner support elements, each associated with single V-shaped cell. Depending on the quantity of air to be filtered and the flow velocity, fewer or more such cells may be provided, without limitation.

Figure 5:
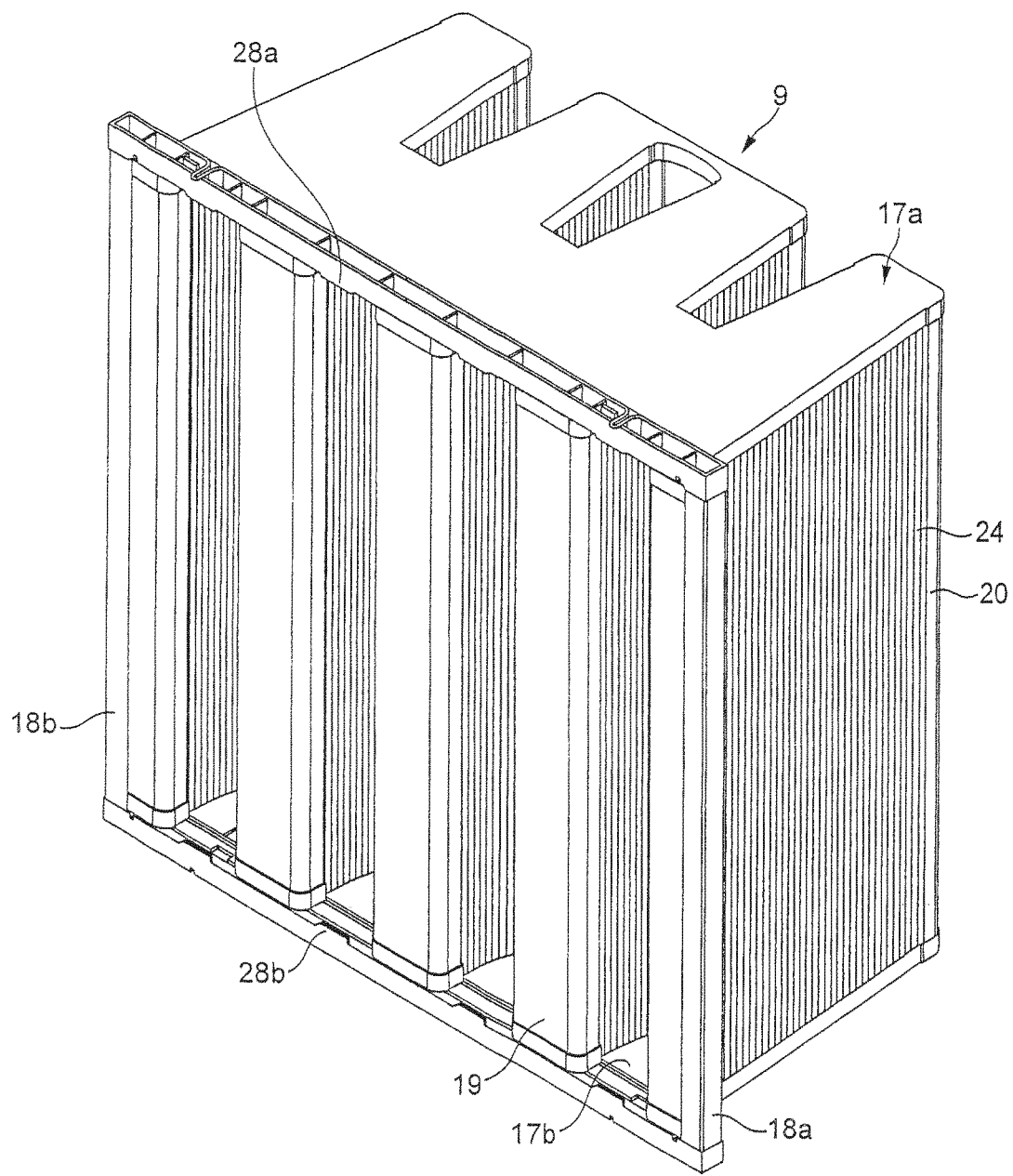
FIG. 5 is a perspective view of a final filter assembly being an embodiment of the present invention.

As can be seen in FIG. 5, the top and bottom cell plates 17a and 17b are provided, one per filter cell, with top and bottom lips 28a and 28b respectively. These lips are formed in the upstream edge of the inner surface of top and bottom cell plates 17a and 17b, respectively, and are centrally located with respect to each inlet aperture of each filter cell. The lips may be formed when the cell plates are formed, e.g. by injection moulding, or may be formed some time later, e.g. by machining. The lips may extend the full width of the cell, or may only extend across a portion of the cell. More than one lip may be provided, symmetrically or asymmetrically. The purpose and function of these lips will be described below in relation to the mounting of pre-filter assemblies to the final filter assembly 9.

The process of manufacturing the filter assembly of FIG. 5 will now be described.

Firstly, the bottom cell plate 17b is supported, and the side support elements 18a and 18b are introduced to the respective recesses provided in the bottom cell plate, to extend vertically from the cell plate. Next, the outer support elements 20 and inner support elements 19 are positioned as required in their respective recesses.

Tapered dowels 22b and locating studs 21b project upwardly from the surface of bottom cell plate 17b. Equivalent tapered dowels 22a and locating studs 21a are provided on top cell plate 17a to project downwardly in a corresponding manner. These elements are spaced on the inner surfaces of the cell plates such that, when the cell plates are mounted to the side support elements 18a, 18h to define the filter cells, the tapered dowels 22a and 22b and locating studs 21a and 21b project inwardly to the cell to position the filter medium close against inwardly-projecting walls 23a, 23b which define the edge of the cell on the top and bottom cell plates, respectively. Each wall 23b projects upwardly a short distance to surround at least the entire downstream side of each filter cell sufficient to define the exterior downstream contours of the filter cell.

The dowels are placed in a V configuration parallel to the wall running from the inlet aperture at its widest point to the vertex of the V, at which point the wider-diameter locating stud 21b, corresponding to an equivalent stud 21a on the top cell plate, is located. The dowels and the locating studs thus define barriers running parallel to the walls 23a, 23b of the cell plate to enable the filter medium to be securely inserted therebetween, such that the top and bottom of the filter element contact the cell walls 23a and 23b respectively when abutting the inner surfaces of the cell plates 17a, 17b. Naturally, therefore, the spacing of the dowels from the cell walls will be selected to match the thickness of the intended filter medium.

Where the filter medium is a single sheet, the sheet can be bent round locating stud 21b or 21a to form both sides of the V; where two sheets of filter medium are provided, each will abut the locating stud.

Since the dowels taper, they progressively apply greater positioning force to the filter medium, the deeper the filter element is inserted between the dowels and the cell wall, thereby to progressively restrict the position of the filter element until it is securely held when fully inserted and in contact with the inner surface of the cell plate.

Accordingly, once the side support elements 18a and 18b are provided to the bottom cell plate, the filter elements 24 can be inserted in to the spaces between the tapered dowels and the walls of the cell plate such that the filter element is sandwiched between the tapered dowels 22b and the cell wall 23b, abutting the outer support 20 at one end and the inner support elements 19 at the other end. At this stage in the manufacture, the top cell plate 17a may then be placed in an inverted and opposed configuration to the bottom cell plate 17b and lowered on to the cell assembly so that the side support elements 18a and 18b, the inner supports 19, and the outer supports 20 engage with the top cell plate 17a to form an assembled filter unit. Of course, other permutations of these operations will suffice to arrive at the assembled filter unit, as will occur to the reader.

However, at this point, while the filter elements are reasonably securely held in the filter casing 10 defined by support elements 18a, 18b, 19 and 20 and top and bottom cell plates 17a and 17b, small non-uniformities in the inner surfaces of the cell plates, the inner surfaces of the supports, or the edges of the filter elements may result in gaps which permit the passage of particles under, above or around the filter elements during operation. To guard against such possibilities, a bonding agent is applied to secure the filter elements to the respective upper and lower cell plates, and the supports 18a, 18b, 19, 20 as appropriate, and to provide a seal between the edges of the filter elements and the abutting surfaces.

To achieve this, an adhesive compound, preferably a curable resin such as polyurethane adhesive is applied to the inner surfaces top and bottom cell plates 17a and 17b, at least to regions where the filter elements 24 come close to or in contact with the cell plates or supports. Further, in embodiments in which the filter element does not wrap around the vertex of the V, and rather each filter cell is provided with two filter elements each form a wall of the V, adhesive sealant should be applied between the filter element and the outer support element 20 and the filter element and the inner support 19, such that when air passes through the inlet aperture of each cell, the only path through the filter is by means of the filter element.

Figure 6:
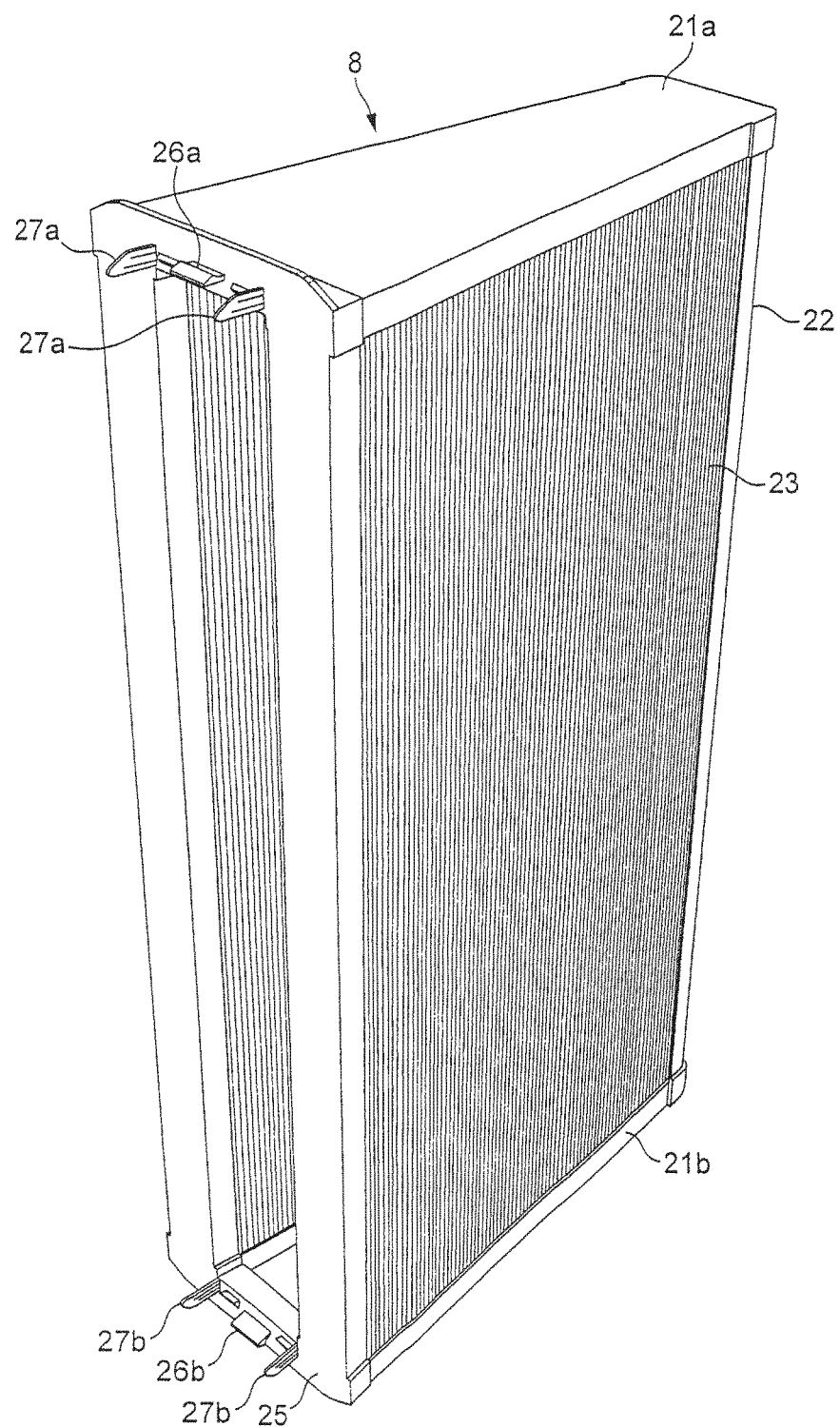
FIG. 6 is a perspective view of a pre-filter assembly being an embodiment of the present invention.

An embodiment of a pre-filter suitable for use with the filter of FIG. 5 is shown in FIG. 6. The pre-filter also defines a generally V-shaped filer cell and comprises pre-filter cell top plate 21a and pre-filter bottom cell plate 21b, which between them support pre-filter element 23.

In the embodiment of FIG. 6, pre-filter element 23 is provided as two individual portions of filter medium, each forming one wall of the V-shaped filter cell, but equivalently a single portion of pre-filter medium of extended length could be used, which forms the entire V-shaped wall of the cell.

In order to relatively space cell plates 21a and 21b at an appropriate distance to accommodate the height of pre-filter element 23, an outlet plate 25 is provided defining a generally rectangular surrounding portion to surround an outlet aperture. Air entering the cell plate through the pre-filter element 23 will thus exit the cell through the outlet aperture. The outlet plate 25 has an essentially planar front surface in the downstream direction of gas flow and a rear surface in which are formed slots to accommodate top and bottom cell plates 21a and 21b to extend substantially perpendicular to the planar front surface of the outlet plate. The outlet aperture formed in the outlet plate communicating between the filter cell and the exterior of the pre-filter 8 is of a similar size to the inlet apertures of the filter assembly shown in FIG. 5, with which it is intended to co-operate.

At the upstream end of the pre-filter assembly 8, an outer support element 22 is provided to provide structural rigidity to the pre-filter 8 by preventing the upstream ends of cell plate 21a and 21b flexing inwardly and thus distorting the pre-filter element 23. In embodiments of the pre-filter 8 in which both sides of the opposed walls of the V-shaped filter cell are formed from a single piece of filter medium bent around the locating stud into a V-shape, the outer support element has a straightforward structural function. However, when the converging walls of the V-shaped cell are formed from two separate portions of filter medium, defining two individual pre-filter elements, the outer support element has a secondary function, namely to seal the upstream tapered end of the filter cell such that air must enter the filter cell only through pre-filter elements 23. The outer support element is formed to be located into corresponding slots, not shown, which are formed in the upstream ends of the inner surfaces of bottom cell plate 21b and top cell plate 21a.

Also visible in FIG. 6 are top and bottom fixing tangs 26a and 26b and top and bottom locating guides 27a and 27b. These elements project in a downstream direction away from the front surface of outlet plate 25.

The bottom fixing tang 26b and locating guides 27b are essentially identical to their counterparts at the top of the outlet plate, such that rotation of the pre-filter 180 degrees about an axis passing through the center of the outer support element and the center of the outlet aperture results in an essentially identical configuration. However, in some embodiments, the size or spacing of these elements may vary. The symmetric positioning described is presently preferred, since it enables the pre-filter to be installed in two equivalent orientations, reducing the risk of misassembly.

Figure 7A:
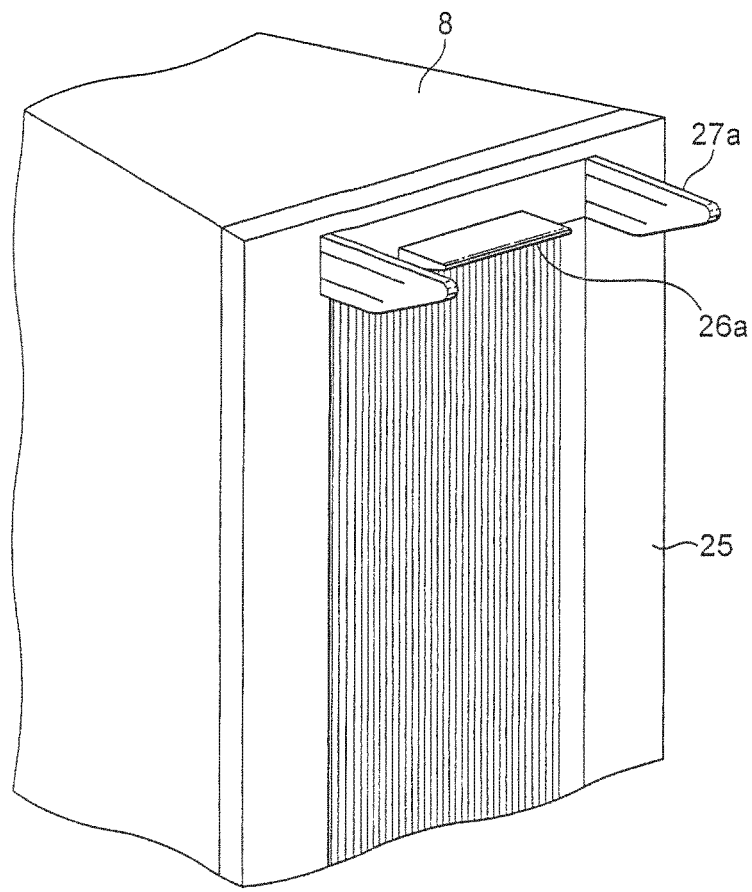
FIG. 7a is a detail of the fixing arrangement used in the embodiment of the present invention shown on FIG. 6.

For brevity, top fixing tang 26a and top locating guides 27a only will be described in detail, and the reader will be able to infer the corresponding construction of bottom locating guides 27b and bottom fixing tang 26b therefrom. FIG. 7a, therefore, shows a perspective view of pre-filter 8, looking obliquely in to outlet aperture formed from surface of outlet plate 25.

Figure 7B:
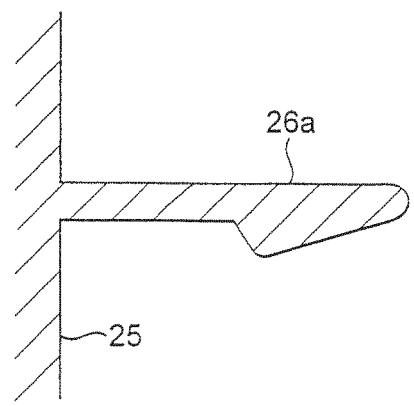

FIG. 7b, to be viewed in conjunction with FIG. 7a, shows a longitudinal section through fixing tang 26a showing how it projects from outlet plate 25. Fixing tang 26a is in the form of a generally planar tab, whose thickness in the vertical direction is much thinner than its extent in the horizontal width direction or its projecting length perpendicular to the front surface of outlet plate 25. In the present embodiment, the tab extends substantially two thirds across the width of the outlet aperture, is approximately centred relative to the longitudinal axis of mirror symmetry of the filter element and has a projecting length of around one third of its width. However, the exact placing and dimensions of the fixing tang are not especially important and can be varied by the skilled person within the scope of the invention. For best effect, the fixing tang should be formed with a width slightly narrower than and a projecting length somewhat deeper than the lip on top cell plate 17a of the filter assembly with which it is to engage.

The fixing tang 26a has a convex protrusion on the outward planar side thereof, being the side outward of the outlet aperture. The convex protrusion is preferably asymmetric in the length direction, with a gradual thickening of the fixing tang from the tip of the fixing tang toward the base where the fixing tang joins the surface of outlet plate 25, and a subsequently steeper thinning to complete the convex protrusion. A base portion then joins the convex protrusion to the outlet plate 25. Such is seen clearly in FIG. 7b, showing the fixing tang in cross-section.

By this construction, when the fixing tang is advanced such the convex protrusion comes in to contact with a lip, the narrower base portion will flex and the convex portion will deflect from the lip to allow the lip to pass, the steeper portion of the convex portion then providing a firm grip on the rear surface of the lip. By this mechanism, fixing tang 26a can cooperate with top lip 28a formed in top cell plate 17a of filter assembly 9, shown in FIG. 5, to engage the pre-filter with the final filter in such a way that the front surface of outlet plate 25 is brought into sealing contact with either side support elements 18a or 18b or support elements 19 to position the outlet aperture of the outlet plate 25 over the inlet aperture of the filter cells of filter assembly 9. In some embodiments, a sealing gasket, made of a resilient and permeable material can be interposed between outlet plate 25 and final filter assembly 9 to provide a more reliable seal. However, due to the sloped construction of the steep portion of the fixing tang 29a, the tendency of the tang to resile to a configuration perpendicular to the face of the outlet plate can provide strong and secure engagement of the convex portion with lip 28a.

Corresponding tang 26b is provided at the bottom of the outlet aperture as shown in FIG. 6, positioned such that the two tangs cooperate to vertically center the outlet aperture over the inlet aperture of the final filter assembly. For best effect, the outward side of each fixing tang 26a, 26b should be positioned at a height to just clear each corresponding lip 28a and 28b when the inlet and outlet apertures are approximated.

An equivalent engagement would be possible with the fixing tang and fixing lip reversed, such that the final filter assembly 9 is provided with fixing tangs for each filter cell and the Pre-filter assembly is provided with fixing lips; this configuration is, however, not presently preferred since the pre-filter assemblies are more frequently replaced than the final filter assemblies and therefore the possibility of fatigue due to the flexing of the fixing tang 26a in engagement/disengagement operations is less troublesome when occurring in a part which is more frequently replaced.

Alternative embodiments could provide tangs positioned asymmetrically relative to the aperture or more than one tang on top and bottom edges of the aperture. The described embodiment is presently preferred, for simplicity. Any pair of complementary fixing means could, however, put the invention into effect.

Figure 8A:
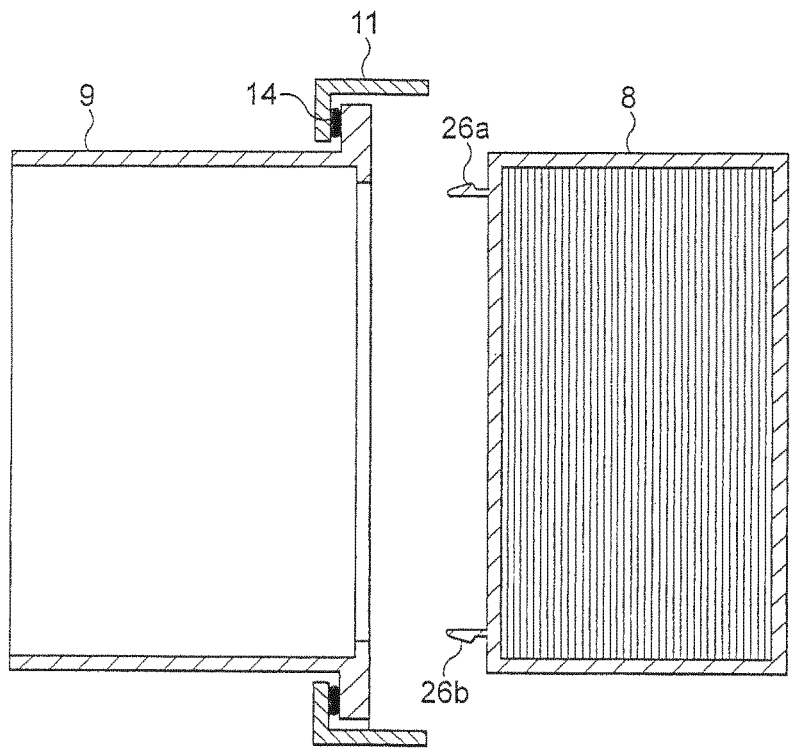
FIG. 8a is a longitudinal section of the final filter assembly of FIG. 5 and the pre-filter assembly of FIG. 6 when aligned for engagement.
Figure 8B:
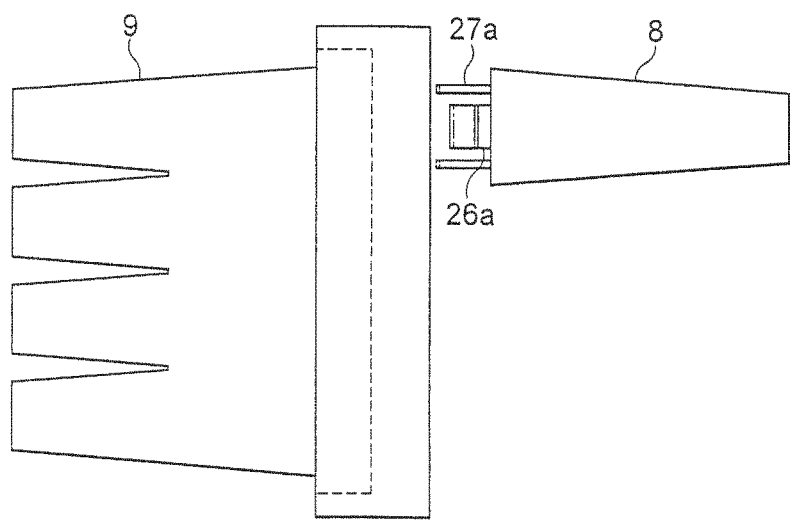
Figure 9:
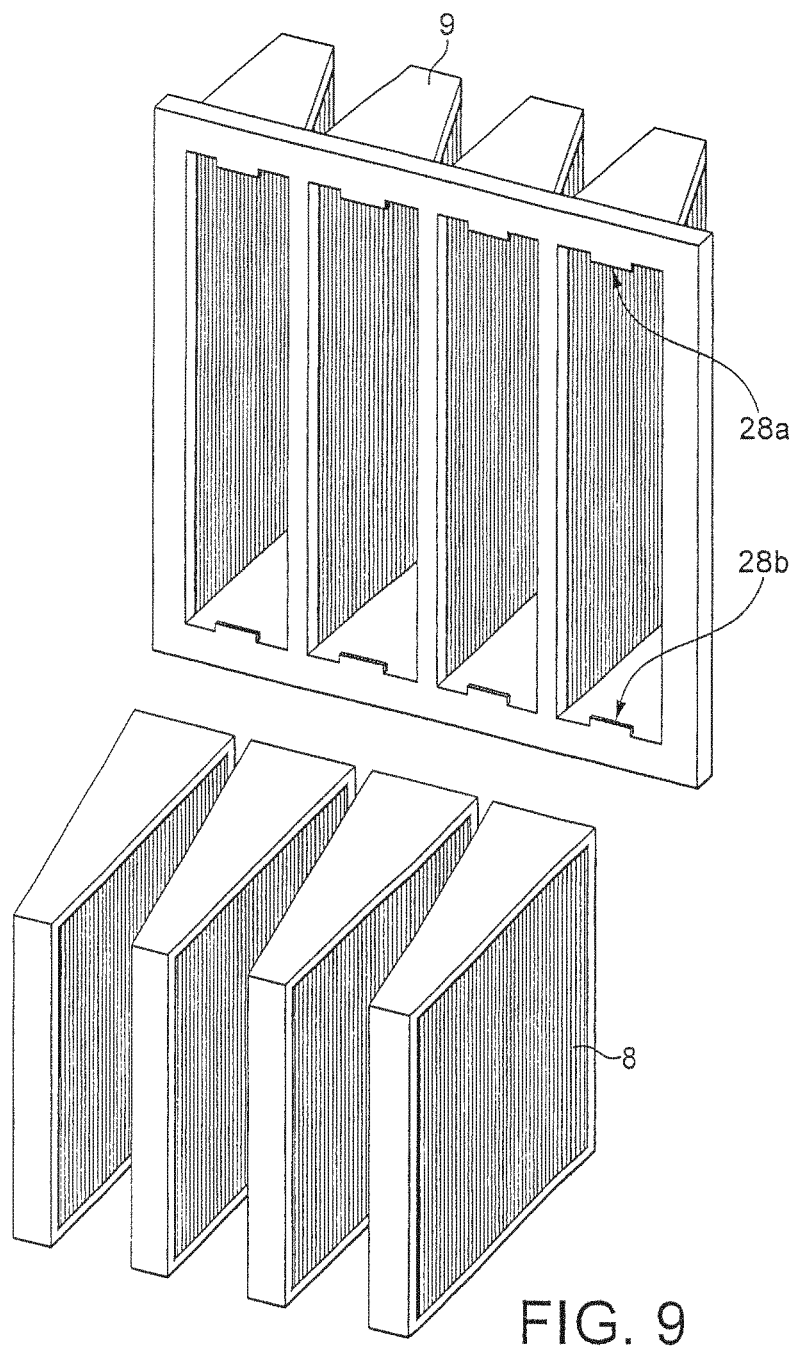
FIG. 9 is a perspective view of a plurality of pre-filter assemblies according to FIG. 6 being brought in to engagement with the final filter assembly of FIG. 5.
Figure 10:
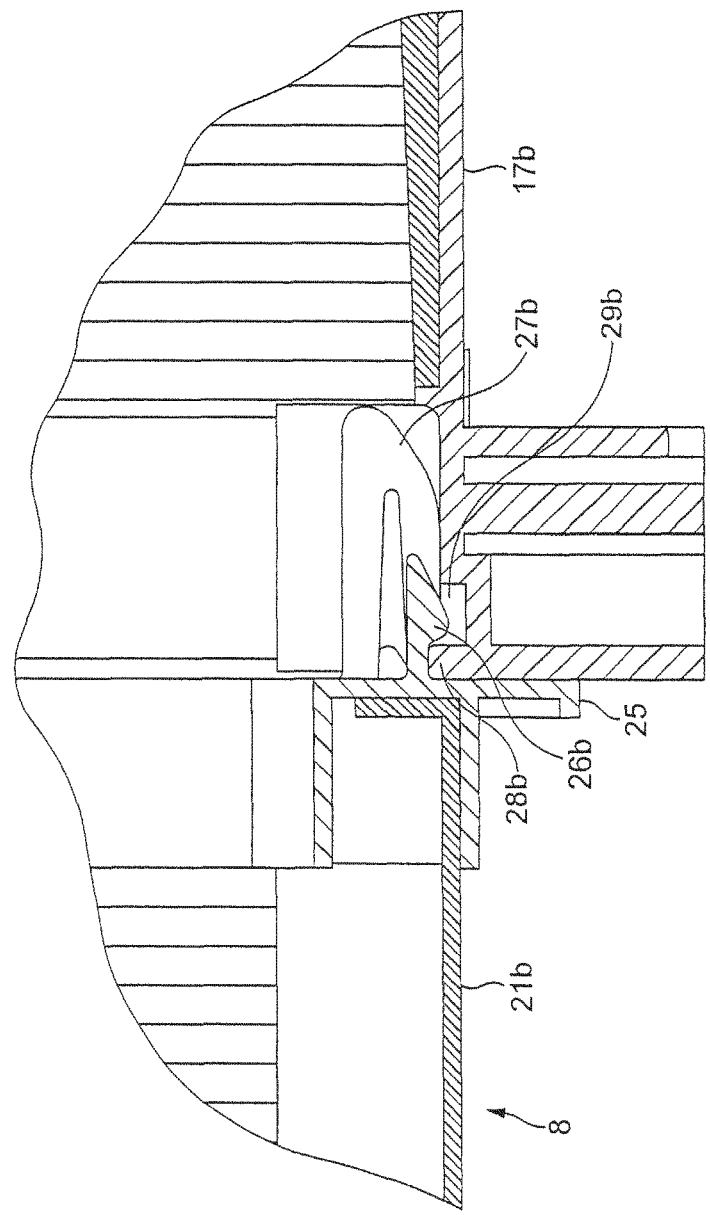
FIG. 10 is a longitudinal section through the arrangement of FIG. 8a and FIG. 8b, after engagement is achieved between the filter assembly and the pre-filter assembly.

The positioning of the pre-filter 8 and the final filter 9 prior to engagement of the one with the other is shown in FIG. 8a and FIG. 8b, respectively in transverse and plan view, while the positioning of lips 28a and 28b is most clearly seen in FIG. 9. FIG. 10 provides a very detailed transverse view of the pre-filter 8 and the filter 9 when engaged, showing the fixing tang 26b in engagement with lip 28b. It should also be observed in FIG. 10 that, in the embodiment shown therein, an indentation 28b is provided to the cell plate 17b on a downstream side of lip 28b; this is optional but permits the convex portion of fixing tang 28*b* to be large and therefore to provide a more positive engagement with cell plate 17*b*. An equivalent construction is provided to top cell plate 17*a*.

Also provided to the front surface of outlet plate 25 are top and bottom locating guides 27*a* and 27*b*, as shown in FIG. 6. These are provided in pairs projecting Horizontally outwardly from the front surface of outlet plate 25, having a generally tapering form and located at the corners of the outlet aperture. These are positioned such that when the outlet aperture is correctly centred over the inlet aperture of final filter assembly 9, the locating guides 27*a* and 27*b* are each in contact with the inner surface of at least one of the supports and the cell plates which define the inlet aperture.

It is particularly advantageous if, as shown in FIG. 5, the portions defining the inlet aperture are provided with inclined guide surfaces outwardly diverging from the inlet aperture in an upstream direction. Therefore, when the pre-filter 8 is brought into misaligned contact with the filter assembly 9, one of the locating guides 27*a* and 27*b* will contact the guide surface, which will tend to deflect the locating guides toward the correct location over the aperture as the apertures are approximated. Therefore, correct engagement of tangs 26*a*, 26*b* and lips 28*a*, 28*b* can be achieved easily.

Of course, other forms of locating guide may be used, and indeed the locating guides may be provided projecting in an upstream direction from the final filter assembly to cooperate with guiding surfaces on the pre-filter. However, this alternative configuration is not preferred, since the guides are vulnerable to breakage if forced, and if the guides are broken on the pre-filter assembly, only the pre-filter assembly needs be replaced, whereas if the guides are broken on the final filter assembly, the whole final filter assembly would need to be replaced.

The positions of the locating guides relative to the fixing tangs may also be seen in FIG. 10, where the tapered tip of the locating guide is adapted to taper in a vertical plane perpendicular to the inner surface of the cell plates so that contact of the tip with the inner surface of the top and bottom cell plates 17*a* and 17*b* will tend to center the aperture vertically to bring the fixing tangs 28*a* and 28*b* into a suitable position to contact, deflect over, and engage with lips 28*a* and 28*b* as shown in FIG. 10. The result of this engagement may be seen in FIG. 11, wherein pre-filter 8 is directly engaged with final filter 9 by means of the fixing tangs 28*a* and 28*b* in cooperation with lips 28*a* and 28*b*.

Figure 11:
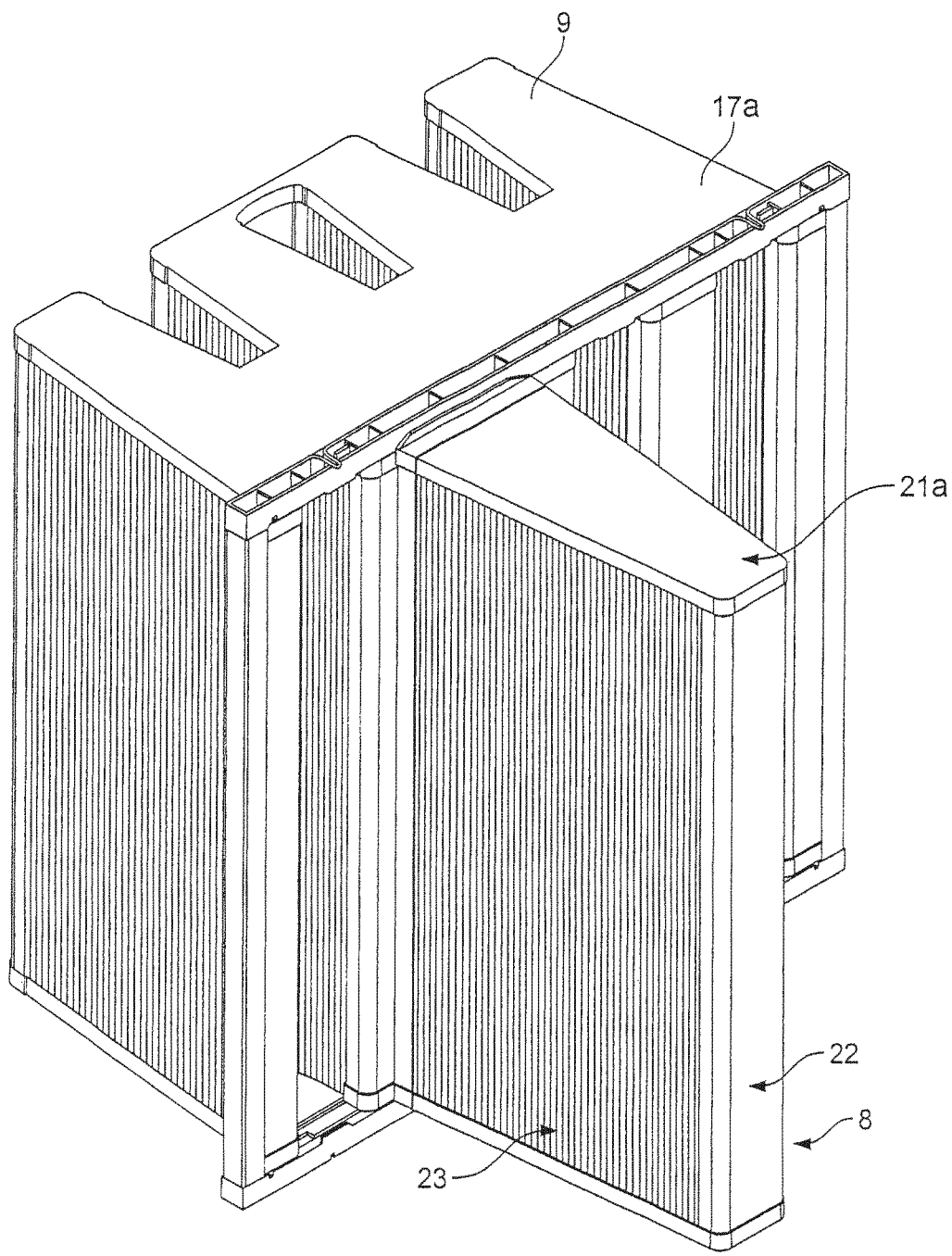
FIG. 11 is a perspective view showing one pre-filter assembly of FIG. 6 engaged with a filter assembly as in FIG. 5.

Once the configuration shown in FIG. 11 has been achieved, a second, third and fourth pre-filter may sequentially be introduced to each filter cell of final filter 9, such that to pass through the filter assembly, air must pass through both a pre-filter cell and a filter cell, on the upstream and downstream sides respectively.

When one pre-filter becomes clogged, it may be replaced without disturbing the others simply by providing sufficient force in an upstream direction to cause fixing tangs 26*a* and 26*b* to be inwardly deflected by lips 28*a* and 28*b*, thereby to disengage tangs and lips such that the pre-filter and the filter may be separated.

Of course, a variety of alternative embodiments of the invention can be devised by those skilled in the art on the basis of the foregoing examples in the light of their own technical requirements, general knowledge, and custom practice in their own respective situation. For example, the present invention can be put into practice equally with pleated paper as a filter medium, a polymer planar porous material, or woven glass fibre mats. Presently preferred for the pre-filter medium is a pleated media pack. The structural portions of the filter assembly, including the cell plates, support elements and outlet plate can be formed from plastics, such as acrylonitrile butadiene styrene (ABS), or metals, and may be formed by any appropriate technique, such as injection moulding, machining, or other process.

The invention may be put into effect in situation where there are a greater or lesser number of apertures in the filter assembly, or when the pre-filter unit itself comprises two or more filter cells. For example, a final filter assembly having four apertures may cooperate with pre-filter elements each having two outlet apertures and two associated filter cells sharing a common single outlet plate, without limitation. However, for maximum flexibility, the above described arrangement is presently preferred, wherein plural single-cell pre-filters are used in cooperation with a final filter assembly having plural filter cells and a correspondingly plurality of inlet apertures.

The invention can also be put into effect in a configuration in which the filter medium of either the final filter assembly or the pre-filter follow a completely or partially continuous folded path around one or more cells rather than being provided as single planar walls; that is to say, the upstream and downstream ends of filter elements 24 shown in FIG. 5 may be variously joined together. In such cases either of inner support elements 19 and outer support elements may be redundant.

Indeed, the cells need not be V-shaped, but could also be rectangular, or curved in form. Such constructions would equivalently realise the advantageous benefits of the claimed invention. Other locating means to the tapered dowels and/or locating studs may also be used in embodiments of the invention; such alternatives may include grooves provided to the inner surfaces of the top and bottom cell plates 17*a* and 17*b* to locate the filter elements, projecting walls between which the filter elements 24 are to be sandwiched, or similar configurations.

Generally, once the advantage of providing a pre-filter casing adapted to be releasably engagable directly with a final filter casing so as to fixedly position the outlet aperture of the pre-filter casing over the inlet aperture of the filter casing, thereby to seal the apertures together, is understood, those skilled in the will be able to realise other configuration which achieve the advantageous effect. Any and all such variations are considered to be within the scope of the claimed invention.

The invention claimed is:
1. A filter assembly, comprising:
a filter casing for mounting to a mounting frame of a duct,
   the filter casing having a plurality of inlet apertures, each
   inlet aperture being associated with a respective filter
   cell of the casing and being adapted to permit gas to flow
   through the casing from the inlet apertures;
a filter medium provided to each filter cell of the casing to
   filter for filtering gas flowing through the casing; and
a plurality of pre-filters, each pre-filter comprising:
a pre-filter casing having an outlet aperture and being
   adapted to permit gas to flow through the pre-filter casing to the outlet aperture; and
a pre-filter medium provided to the pre-filter casing to filter
   gas flowing through the pre-filter casing,
wherein each pre-filter casing is releasably engaged
   directly with the filter casing so as to fixedly position the
   outlet aperture of the pre-filter casing, directly or via an
   interposed sealing gasket, over an inlet aperture of the
   filter casing, thereby to seal the inlet and outlet apertures
   together.

2. The filter assembly according to claim 1, wherein the pre-filter casing is adapted to engage directly with the filter casing by means of one of:
   a) fixing tang provided to the pre-filter casing and a corresponding fixing lip provided to the filter casing; and
   b) a fixing tang provided to the filter casing and a corresponding fixing lip provided to the pre-filter casing,
   such that by aligning the fixing tang with the fixing lip and relatively approximately the filter casing and the pre-filter casing, a snap-fit engagement may be achieved.

3. The filter assembly according to claim 1, wherein one of:
   a) a locating projection is provided to the pre-filter casing and a corresponding locating surface is provided to the filter casing; and
   b) a locating projection is provided to the filter casing and a corresponding locating surface is provided to the pre-filter casing,
   such that by positioning the locating projection against the locating surface, the inlet and outlet apertures become aligned.

4. The filter assembly according to claim 1, wherein the filter casing comprises:
   top and bottom cell plates for defining a filter cell with the filter medium;
   first and second side support elements for maintaining the cell plates at a predetermined spacing; and
   optionally, a plurality of inner support elements for spacing individual elements of the filter medium one from another.

5. The filter assembly according to claim 1, wherein the pre-filter casing comprises:
   top and bottom cell plates for defining a pre-filter cell with the filter medium; and
   an outlet plate and an outer support element for maintaining the cell plates at a predetermined spacing.

6. The filter assembly according to claim 4, wherein the filter casing defines a plurality of V-shaped filter cells arranged in a row running perpendicular to the direction of gas flow through the casing.

7. A filter assembly according to claim 4, wherein the filter medium is located relative to the top and bottom cell plates by retaining structures formed on the cell plates.

8. The filter assembly according to claim 1, wherein the pre-filter casing defines a V-shaped filter cell.

9. The filter assembly according to claim 1, wherein the filter assembly is adapted for use as an air intake filter.

10. The filter assembly according to claim 9, wherein the filter assembly is adapted for use as an air intake filter for a gas turbine.

11. A kit, comprising:
    a filter assembly, comprising:
       a filter casing for mounting to a mounting frame of a duct, the filter casing having a plurality of inlet apertures, each inlet aperture being associated with a respective filter cell of the casing, and being adapted to permit gas to flow through the casing from the inlet apertures; and
       a filter medium provided to each filter cell of the filter casing for filtering gas flowing through the filter casing;
    and
    a plurality of pre-filter assemblies, each pre-filter assembly comprising:
       a pre-filter casing having an outlet aperture and being adapted to permit gas to flow through the pre-filter casing to the outlet aperture; and
       a pre-filter medium provided to the pre-filter casing to filter gas flowing through the pre-filter casing,
       wherein each pre-filter casing is provided with first engaging means adapted to engage directly with the filter casing having second complementary engaging means provided thereto so as to fixedly position the outlet aperture of the pre-filter casing, directly or via an interposed sealing gasket, over an inlet aperture of the filter casing, thereby to seal the inlet and outlet apertures together.

12. The kit according to claim 11, wherein the pre-filter casing comprises:
    top and bottom cell plates for defining a pre-filter cell with the pre-filter medium; and
    an outlet aperture plate and an outer support element for maintaining the top and bottom cell plates at a predetermined spacing.

13. The kit according to claim 11, wherein the pre-filter casing defines a V-shaped filter cell.

14. A filter assembly according to claim 5, wherein the filter medium is located relative to the top and bottom cell plates by retaining structures formed on the cell plates.

* * * * *